United States Patent [19]

Kurtz et al.

[11] 4,172,795
[45] Oct. 30, 1979

[54] CENTRIFUGAL PRESSURE FILTER WITH HORIZONTAL FILTER DISKS

[75] Inventors: Hans-Ottomar Kurtz, Dortmund; Hans-D. Kluger, Holzwickede; Paul Simmich, Hagen, all of Fed. Rep. of Germany

[73] Assignee: Friedrich Uhde GmbH, Dortmund, Fed. Rep. of Germany

[21] Appl. No.: 865,130

[22] Filed: Dec. 28, 1977

Related U.S. Application Data

[63] Continuation of Ser. No. 739,637, Nov. 8, 1976, abandoned.

[51] Int. Cl.² ............................................. B01D 33/26
[52] U.S. Cl. .................................... 210/236; 210/331; 210/347
[58] Field of Search ............... 210/331, 347, 332, 232, 210/236

[56] References Cited

U.S. PATENT DOCUMENTS 3,190,449  6/1965  Muller ........................... 210/331 X

FOREIGN PATENT DOCUMENTS 1307957  9/1962  France ..................................... 210/331

Primary Examiner—Frank A. Spear, Jr.
Attorney, Agent, or Firm—Wilson, Fraser & Clemens

[57] ABSTRACT

A vertically disposed centrifugal pressure filter for suspensions has a closed casing containing a sectional hollow rotary shaft, the long section of which is equipped with filter disks within the casing. A relatively short shaft section has a plug-in connection with the lower end of the long shaft section and has bearing in an outside bearing casing detachably connected to the filter casing. Dynamic sealing means is provided between the short shaft section and the bearing casing, so that when the bearing casing and short shaft section are disconnected from the filter casing and long shaft section, the seal for the short shaft section is not disturbed. The filtrate passes through the shaft sections and to the outside through the bearing casing.

1 Claim, 2 Drawing Figures

CENTRIFUGAL PRESSURE FILTER WITH HORIZONTAL FILTER DISKS

This is a continuation of Application Ser. No. 739,637, filed Nov. 8, 1976, which is now abandoned.

BACKGROUND OF THE INVENTION

The present invention relates to a centrifugal pressure filter with horizontal filter disks, the filtrate being discharged via a central hollow shaft. Centrifugal filters serve to remove solids from suspensions.

Centrifugal filters of the type described above are usually subjected to heavy loads, i.e. severe wear and tear, firstly due to the selected operating pressure and secondly by the suspension to be filtered, or more precisely, the eroding characteristics of the solid particles contained in the suspension. As a result, the filter must be checked at monthly to yearly intervals and it might be necessary to renew the screens on the filter disks just as often.

Conventional centrifugal pressure filters have a plurality of horizontal filter disks arranged on a central hollow shaft with a corresponding number of intermediate seals. The filtrate space of each filter disk is connected to the inside of the central hollow shaft via openings. The horizontal filter disk package and the central hollow shaft are arranged in a pressure casing and supported by bearings at both ends, i.e. at the top and bottom of the casing, in such a manner that the filter package can be rotated at high speed in order to centrifuge the filter cake. The suspension space between the casing and the filter package is isolated from the bearings of the central shaft by means of dynamic seals in order to prevent solid particles from penetrating into the bearings, as otherwise the bearings would be destroyed within a very short time.

Pressure filters which are known at present are operated in such a manner that the suspension containing solid particles is fed into the casing under pressure via intake nozzles when the pressure filter disk package is not rotating. The suspension is separated into filtrate and filter cake by means of the filter screen on the filter disks. The filtrate enters the filtrate space in the filter disks and the central hollow shaft and leaves the centrifugal filter through radial openings in the lower part of the central hollow shaft and through an outlet nozzle.

When the suspension is continuously being fed into the centrifugal filter, solids in the form of a filter cake settle on the filter disks after some time, i.e. after several hours or minutes, to such an extent that the throughput decreases considerably. The filter must then be cleaned. For this purpose, the suspension feed and the filtrate discharge are interrupted, the filter package on the central hollow shaft is rotated and the filter cake is then centrifuged from the filter disks. The filter cake is removed at the lowest point of the filter casing via a discharge opening.

If necessary, thorough cleaning of the filter disk screens can be achieved by means of backwashing. After the filter has been cleaned, the suspension feed is recommenced. In order to ensure continuous operation, suspension filtering units usually contain a number of centrifugal filters so that individual filters can be cleaned or serviced in turn without operation being interruped.

The servicing of a centrifugal filter takes up considerable time. When the filter casing is opened, the filter package, arranged on the central hollow shaft, is removed and placed outside the casing for inspection and, if necessary, the filter disks are relined. Otherwise the shaft is left in the casing and the filter disks are removed one by one, relined and then replaced on the central hollow shaft in the casing, alternately with the intermediate seals.

Centrifugal filters of the types known up to now, i.e. those with a removable shaft and those with a fixed shaft, have considerable disadvantages. The filter package arranged on the shaft can only be removed and inserted by means of a crane and the insertion of the shaft into the dynamic seals cannot be observed due to its inaccessibility. Consequently, these seals are likely to be damaged or not fitted properly resulting in poor sealing.

Placing the new filter disks and intermediate seals individually onto the shaft, which is arranged in the casing, takes up a considerable amount of time because of the lack of space available, and there is no possibility of observing the lowermost disks. In both cases, defects, such as short circuits for the flow of suspension, cannot be detected until after restart-up, i.e. until after the casing has been closed tight and all the feed and discharge lines have been connected. It has been found that, for known centrifugal filters, the leakage rate can be considerable after the filter disks have been relined and reassembled.

SUMMARY OF THE INVENTION

The object of the invention is to avoid the described disadvantages of known designs.

According to the invention, this problem is solved by a central hollow rotary shaft consisting of at least two parts. A long shaft section is the carrier of the horizontal filter disks and a short shaft section is sealed off from the casing and the suspension space by means of a dynamic seal assembly. The bearing of the short shaft section is arranged outside the suspension space, i.e. outside the filter casing filled with the suspension. The torsional connection between the two shaft sections is of the plug-in type and has at least one seal between the suspension space and the filtrate space.

In order to facilitate the checking or removal of the bearing of the short shaft section without having to remove the filter package, a further embodiment of the invention provides the long shaft section with a stop ring at the plug-in end.

The advantages achieved with the invention lie mainly in the fact that it obviates the need for careful removal and replacement of the central shaft from and into the dynamic seal, which was hitherto necessary for routine servicing of the filter package for the purpose of relining the filter disks. It also rules out the possibility of damage to the dynamic seal during servicing and thus the risk of time consuming repairs to the centrifugal filter.

The inventive design is particularly advantageous for centrifugal filters which are used for suspensions with highly erosive, i.e. hard, solid particles. In such cases, if hard particles come into contact with the seal when inserting the central hollow shaft with filter disks into a conventionally arranged dynamic seal, the seal would be destroyed within a short time. To summarize, it follows that, due to the modern design of the centrifugal pressure filter, its operational availability is greatly increased and the service life of the dynamic seal is independent of the number of times the filter package is serviced.

BRIEF DESCRIPTION OF THE DRAWINGS

An embodiment of the invention is shown in the drawings and is described in detail below.

DESCRIPTION OF THE PREFERRED EMBODIMENT

Figure 1:
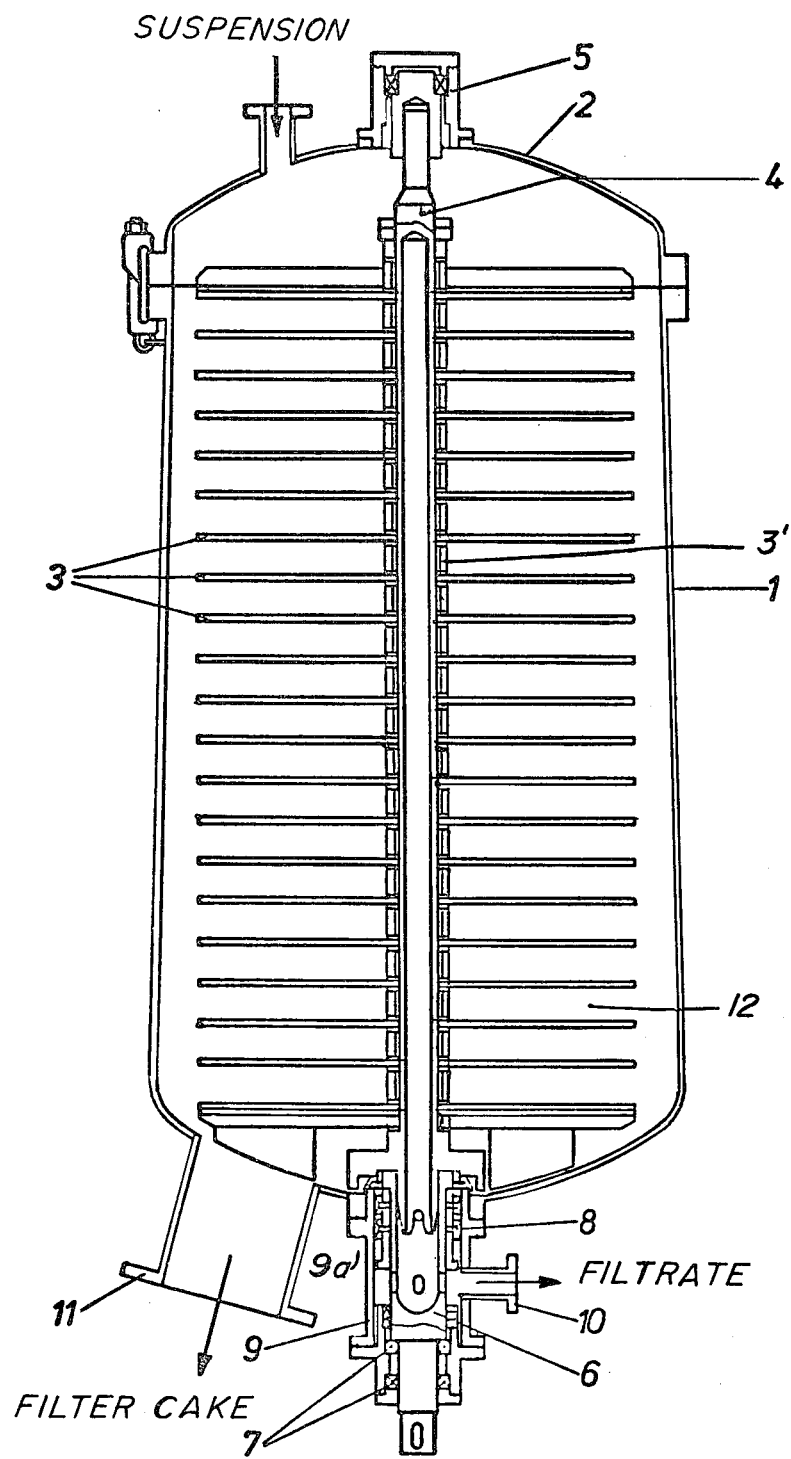
FIG. 1 is a somewhat diagrammatic vertical sectional view of a centrifugal pressure filter.

The illustrated embodiment of the invention comprises a cylindrical centrifugal pressure filter casing 1 arranged vertically and closed at the top with a cover 2 which has the same inside diameter as the casing and is provided with an inlet nozzle. Filter disks 3, lined with filter screens, are arranged with intermediate seals 3' on a long shaft section 4 to form the filter assembly. The long rotary driven shaft section 4 is held at the top by a bearing 5 and is torsionally coupled at the bottom in a plug-in telescopic manner to a short driving shaft section 6. To provide such plug-in connection, the lower shaft section 6 has a socket 6a into which the lower end of the upper shaft section 4 fits. The lower end of the shaft section 4 has a notched end 4a to engage a transverse drive rod 6b on the short shaft section 6.

The short shaft section 6 has antifriction bearings 7 and a dynamic seal assembly 8, and these are accommodated mainly inside a lower bearing casing 9. An outlet nozzle 10 for the filtrate (clarified liquid) is also situated in the bearing casing 9. The casing 1 has a nozzle 11 at the bottom for discharging the filter cake.

Figure 2:
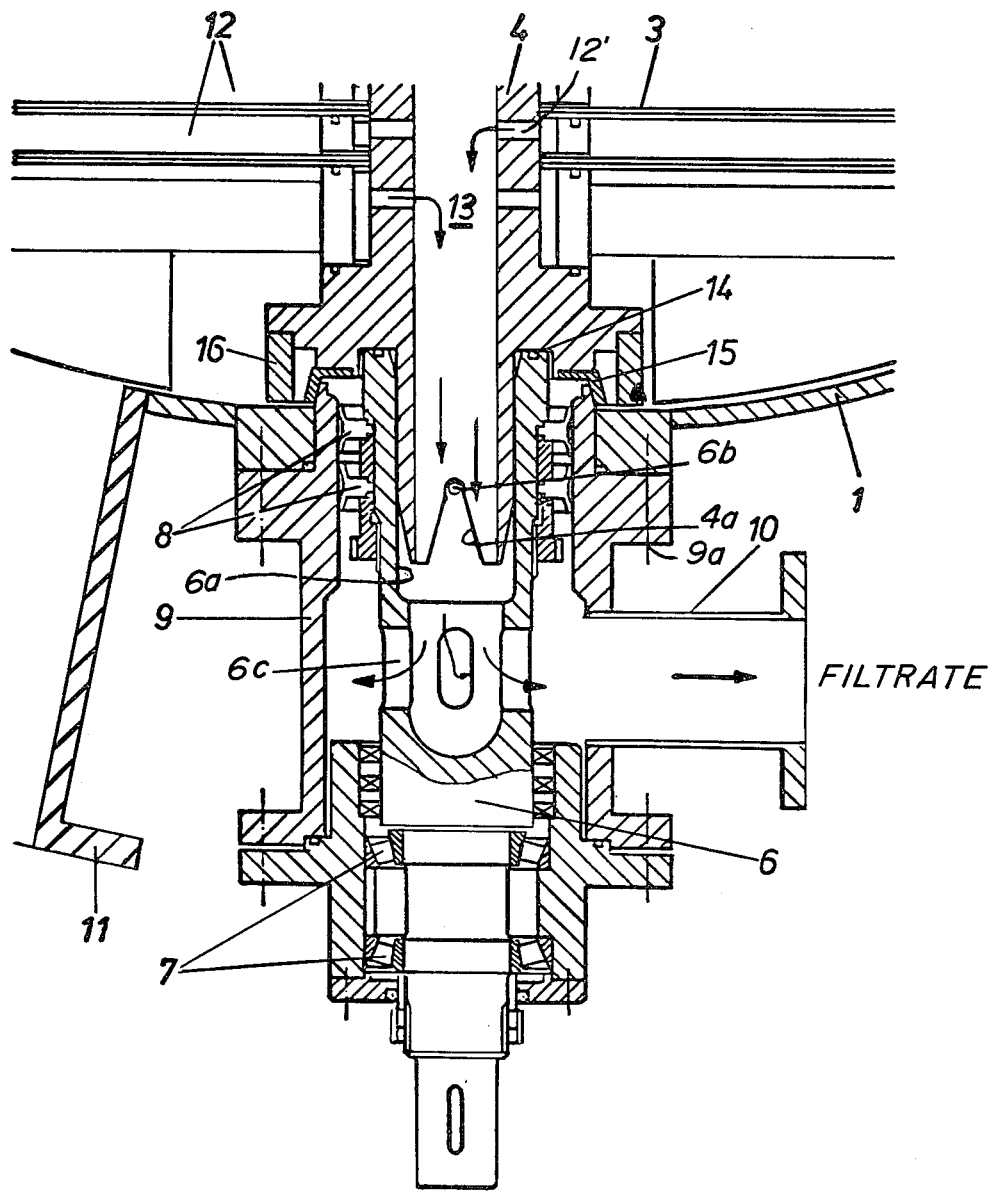
FIG. 2 is an enlarged vertical sectional view of a fragment of the lower part of the filter shown in FIG. 1 and showing particularly the bearing and seal.

FIG. 2 shows that during shut-down of the filter assembly the suspension to be filtered leaves a suspension space 12 of the casing via the filter disks 3 and passes in the form of filtrate through a series of radial openings 12' in the long section 4 of the shaft into a central bore 13 of this shaft section. The filtrate then flows downwards through the socket 6a in the short shaft section 6, through the outlet openings 6c of this shaft section, and finally through the outlet nozzle 10. The seal assembly 8 between the short shaft section 6 and the bearing casing 9 is the dynamic seal which prevents the suspension from the suspension space 12 mixing with the filtrate.

In the form of construction illustrated, the seal rings for the seal assembly 8 are shown as lip seals, but any other reliable type may be used. An essential feature of the invention is that, when the filter assembly is removed from the casing, the short shaft section 6 with its bearings 7 and the dynamic seal assembly 8 are not displaced in relation to the seal lips and seal lip contact surfaces. Consequently, this seal assembly cannot be damaged by the repeated removal and replacement of the filter assembly.

A seal 14, between the short shaft section 6 and the long shaft section 4, represents the internal sealing between the two shaft sections. A collar or gasket 15, between the lower end of the shaft section 4 and bearing casing 9, server to pre-seal the suspension space 12.

By means of the lower bearings 7, the filter assembly is held in such a position in relation to the casing 1 that there is a clearance between a stop ring 16 carried by the lower end portion of the long shaft section 4 and the bottom of the casing 1. The lower bearing casing 9, together with the short shaft section 6, can thus be removed easily, if this should be necessary for any reason. When attaching bolts 9a of the bearing casing 9 on the bottom of the centrifugal pressure filter have been loosened, the stop ring 16 of the long shaft section 4 will rest on the bottom of the filter casing 1. When the lower bearing casing 9 is re-inserted, the filter assembly is raised. Thus, the centrifugal pressure filter is completely operable without the necessity of removing the filter assembly from the casing 1.

What we claim is:

1. A centrifugal pressure filter comprising
   a. a closed vertically disposed filter casing having an inlet opening for the suspension to be filtered at the top and a discharge opening at the bottom for filter cake,
   b. a sectional hollow rotary shaft, having a relatively long section almost entirely arranged within said casing provided with a series of radial holes for the passage of filtrate,
   c. axially spaced, horizontally disposed filter disks on said long shaft section,
   d. a removable bearing casing situated outside of and detachably connected to said filter casing,
   e. a relatively short shaft section almost entirely arranged within said bearing casing and having its upper end operatively connected to the lower end of said long shaft section,
   f. a detachable torsional connection between the lower end of said long and the upper end of said short shaft sections,
   g. a removable bearing casing for said short shaft section outside said filter casing and enclosing said detachable connection,
   h. antifriction bearings for said short shaft section in the lower portion of said bearing casing,
   i. a dynamic fluid seal assembly disposed in said bearing casing above said bearings for sealing said bearing casing to prevent the suspension from said filter casing mixing with the filtrate,
   j. a fluid seal between said shaft sections at the end portions thereof,
   k. a collar gasket situated between the lower end of said long shaft section and the upper end of said bearing casing,
   l. a ring on the lower end portion of said long shaft section for engagement with the bottom of said filter casing for retaining the long shaft section within said filter casing upon removal of said bearing casing from said filter casing,
   m. said short shaft section having discharge openings for filtrate arranged below said assembly and above said antifriction bearings, and
   n. a duct in said bearing casing to the outside adjacent said discharge openings providing a filtrate outlet from said bearing casing.

* * * * *